(12) United States Patent
Martino et al.

(10) Patent No.: US 9,392,107 B2
(45) Date of Patent: *Jul. 12, 2016

(54) INFORMATION PROVIDED TO PARENT REGARDING A CALLED FOR CHILD PROTECTION

(71) Applicant: I D YOU, LLC, Allen, TX (US)

(72) Inventors: Monica Rose Martino, McKinney, TX (US); M. Gregory Smith, Fairview, TX (US); Kevin V. Nguyen, Allen, TX (US)

(73) Assignee: I D YOU, LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,973

(22) Filed: Apr. 21, 2015

(65) Prior Publication Data

US 2015/0229760 A1     Aug. 13, 2015

Related U.S. Application Data

(63) Continuation of application No. 13/859,918, filed on Apr. 10, 2013, now Pat. No. 9,036,797, which is a continuation of application No. 12/890,804, filed on Sep. 27, 2010, now Pat. No. 8,447,018, which is a continuation-in-part of application No. 11/974,983, filed on Oct. 17, 2007, now Pat. No. 8,625,762, said application No. 12/890,804 is a continuation-in-part of application No. 11/974,944, filed on Oct. 17, 2007, now Pat. No. 8,488,754.

(60) Provisional application No. 60/934,407, filed on Jun. 13, 2007.

(51) Int. Cl.
| | | |
|---|---|---|
| H04M 1/56 | (2006.01) | |
| H04M 15/06 | (2006.01) | |
| H04M 3/42 | (2006.01) | |
| H04M 1/24 | (2006.01) | |
| G08B 25/00 | (2006.01) | |
| H04M 1/57 | (2006.01) | |
| H04M 1/663 | (2006.01) | |
| H04M 3/22 | (2006.01) | |
| H04M 3/436 | (2006.01) | |
| H04W 4/12 | (2009.01) | |
| H04W 8/20 | (2009.01) | |
| H04L 12/58 | (2006.01) | |

(52) U.S. Cl.
CPC ......... *H04M 3/42068* (2013.01); *G08B 25/005* (2013.01); *H04L 51/26* (2013.01); *H04L 51/28* (2013.01); *H04M 1/575* (2013.01); *H04M 1/663* (2013.01); *H04M 3/2281* (2013.01); *H04M 3/42059* (2013.01); *H04M 3/436* (2013.01); *H04M 15/06* (2013.01); *H04W 4/12* (2013.01); *H04W 8/205* (2013.01); *H04L 51/12* (2013.01)

(58) Field of Classification Search
CPC .................. H04M 3/42042; H04M 3/42059; H04M 3/436; H04M 15/06; H04M 1/575; H04M 1/57
USPC .............. 379/32.01, 35, 142.01, 142.05, 188, 379/207.12, 210.02, 211.02, 212.01; 455/415
See application file for complete search history.

(56) References Cited

U.S. PATENT DOCUMENTS

| | | | | |
|---|---|---|---|---|
| 8,447,018 B2 * | 5/2013 | Martino | ............... | G08B 25/005 379/142.05 |
| 9,036,797 B2 * | 5/2015 | Martino | ............... | G08B 25/005 379/142.05 |

*Primary Examiner* — Quoc D Tran

(57) ABSTRACT

The present disclosure describes a system, method, and computer readable medium for providing information of a calling party to an alert party, wherein the calling party is in communication with the receiving party in a communications network. The method includes receiving a message from a calling party to a receiving party and performing a lookup of information relating to the calling party in a database, wherein the lookup is based on an identifier associated with the message, Thereafter, an alert is sent to the alert party if the calling party information is unavailable in a contact list of the receiving party.

20 Claims, 5 Drawing Sheets

INFORMATION PROVIDED TO PARENT REGARDING A CALLED FOR CHILD PROTECTION

CROSS REFERENCE TO RELATED APPLICATIONS

This application is a continuation of U.S. application Ser. No. 13/859,918, entitled "INFORMATION PROVIDED TO PARENT REGARDING A CALLED FOR CHILD PROTECTION" and filed on Apr. 10, 2013, which is a continuation of U.S. application Ser. No. 12/890,804 entitled "INFORMATION PROVIDED TO PARENT REGARDING A CALLED FOR CHILD PROTECTION" and filed on Sep. 27, 2010, issued U.S. Pat. No. 8,447,018 and issued on May 21, 2013, which is a continuation-in-part of U.S. application Ser. No. 11/974,983 entitled "PROVIDING ADDITIONAL INFORMATION TO CALLED PARTIES" and filed on Oct. 17, 2007, issued U.S. Pat. No. 8,488,754, issued on Jul. 16, 2013, which is a non-provisional of application Ser. No. 60/934,407 entitled "SYSTEM, METHOD, AND COMPUTER READABLE MEDIUM FOR PROVIDING ENHANCED AUTOMATIC NUMBER IDENTIFICATION FUNCTIONALITY" and filed on Jun. 13, 2007, and which is also a continuation-in-part of U.S. application Ser. No. 11/974,944 entitled "IP-ENABLED INFORMATION DELIVERY" and filed on Oct. 17, 2007, issued U.S. Pat. No. 8,488,754, issued on Jul. 16, 2013. Each of the above applications are incorporated herein by reference.

FIELD OF THE INVENTION

The present disclosure is generally related to a communications network, and more particularly to a system, method, and computer readable medium for providing information of a calling party to an alert party, wherein the calling party is in communication with the receiving party in a communications network.

BACKGROUND OF THE INVENTION

Automatic Number Identification (ANI) is a system utilized by telephone companies to identify the Directory Number (DN) of a calling subscriber. ANI serves a function similar to Caller ID, but may utilize different underlying technology. It is possible that the Caller ID can be blocked by prefixing a call with *67, for example. ANI was originally developed for telephone company billing purposes and is now offered to commercial customers who may benefit from knowing who is calling them. In addition, ANI is one of the core technologies behind the 911 emergency services.

In commercial applications, a user may have an integrated or extraneous display affixed to a telephone. Such a display presents the ANI or telephone number of the calling party. In addition, the display may present the caller's name or calling name, also known as CNAM. The calling party may call or send a message such as a Short Messaging Service (SMS) to a called or a receiving party. The receiving party may receive a call or a message from the calling party that may not be in a contact list of the receiving party. It may be possible that the calling party may be an unrecognized caller. As such, a need exists to send an alert to an alert party if the calling party information is unavailable or unrecognized in a contact list of the receiving party. In another embodiment, an alert can be sent to the alert party for every call.

SUMMARY OF THE INVENTION

The present disclosure describes a method for providing an alert to an alert party in a communications network. The method includes receiving a message from a calling party to a receiving party and performing a lookup of information relating to the calling party in a database. The lookup is based on an identifier associated with the message. Thereafter, an alert is sent to the alert party when the calling party information is unavailable in a contact list of the receiving party. In another embodiment, an alert can be sent to the alert party for every call.

A system for informing an alert to an alert party in a communications network, the system including at least one device for receiving a message from a calling party and at least one database for storing information associated with the calling party. The at least one device is operable to perform a lookup of information relating to the calling party in a database via an Internet Protocol connection. The lookup is based on an identifier associated with the message. Thereafter, send an alert to the alert party if the calling party information is unavailable in a contact list of the receiving party.

A computer-readable medium comprising instructions executable by a device for alerting the information provided to a receiving party in a communications network, the instructions including receiving a message from a calling party and performing a lookup of information relating to the calling party in a database via an Internet Protocol connection. The lookup is based on an identifier associated with the message. Thereafter, an alert is sent to the alert party if the calling party information is unavailable in a contact list of the receiving party.

DETAILED DESCRIPTION

The present disclosure provides information of a calling party to an alert party, wherein the calling party is in communication with the receiving party in a communications network. In the context of the present disclosure, the calling party is a party initiating or sending a message and a receiving party is a party receiving the message. Such a process is initiated when the sending party contacts the receiving party, wherein the sending party and the receiving party each use at least one electronic device and the receiving party is able to receive an ANI or a Caller ID service and is able to display and/or play related information. Thereafter, an alert is sent to an alert party for viewing the message and other information regarding the calling party if the calling party information is unavailable or unrecognized in a contact list of the receiving party. The message comprises a text message, a call or a multimedia message. The at least one electronic device can be a computer, a server, a wireless phone, an Internet Protocol (IP) enabled phone, a wireless IP-enabled phone, or a device that can receive and/or transmit information. The computer readable medium (or software) of the present disclosure is stored on and/or runs on at least one of the above-mentioned electronic devices.

Figure 1:
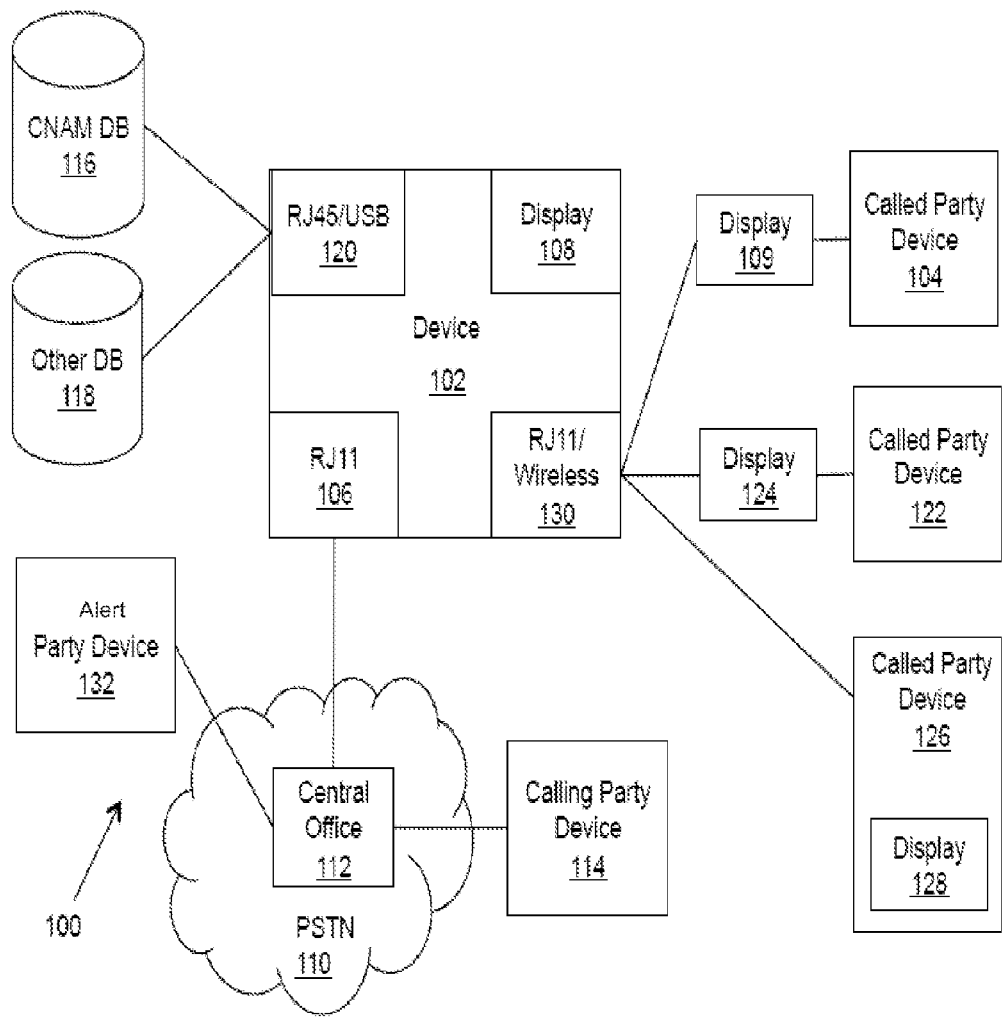
FIG. 1 depicts a system 100 for viewing communication between various parties in accordance with one embodiment of the present disclosure.

FIG. 1 depicts a system 100 for viewing communication between various parties in accordance with one embodiment of the present disclosure. The system 100 includes a device 102 that is able to send information to a called party device 104, hereafter referred to as receiving party device 104. The receiving party device 104 may be communicably coupled to the device 102 via a wired connection or a wireless connection such as a land line telephone or a wireless device including but not limited to a cellular device, a Wi-Fi connection, a PDA, a Bluetooth, etc. The device 102 may be communicably coupled but not limited to a RJ11 (telephone wire) communication address 106 and/or an RJ11/wireless communication address 130. The device 102 can specify any communication address such as 106, 120, and 130 to receive information. The device 102 includes a display 108 for displaying information. In this embodiment, the display 108 is integrated within the device 102. However, the display 108 may be implemented as a standalone device without departing from the spirit and scope of the present disclosure. Further, the device 102 may be connected to one or more displays via a wired and/or wireless connection.

In addition, the device 102 may receive information from a plurality of sources including but not limited to a communications network such as a public switched telephone network (PSTN), code division multiple access (CDMA), a global system for mobile communication (GSM). For example, the public switched telephone network (PSTN) 110 that includes a central office 112 coupled to a calling party device 114, hereafter referred to as the sending party device 114, and an alert party device 132. The information may be received via at least the RJ11 communication address 106 of the device 102. Other sources include a wireless network or data network (not shown) supporting other devices such as a computer or IP enabled phones. Generally, information received by device 102 may include telephone numbers of the sending party and the receiving party. However, various aspects of the present invention authenticate the information provided to receiving parties.

Aspects of the present disclosure provide information to receiving parties, such as the receiving party device 104, by providing an ability to retrieve information of a sending party from a CNAM database 116 and/or another database 118. The CNAM database 116 and the other database 118 comprise information relating to the sending party, for example, sending party name, telephone number, messages, location, and other information associated with the sending party. In addition, the information relating to the sending party may be a city, a state, an address, a hyperlink, a photo, a video, and any information that can be sent via an Internet Protocol (IP) connection. The device 102 communicates with the CNAM database 116 and/or the other database 118 via an IP connection.

When a sending party sends a message using the sending party device 114, the device 102 receives a caller ID, Automatic Number Identification (ANI) or other identifier of the sending party. An example of the identifier may include an IP address of the sending party device 114 or a unique identifier of the sending party that can be received and transmitted by the sending party device 114. The identifier may include information related to at least one of a sending party and a receiving party.

According to certain aspects, upon receiving the caller ID, ANI or other identifier, the device 102 looks up a local list or a contact list of the receiving party device to check whether the sending party device 114 detail is already available in the receiving party device 104. If device 102 finds the sending party device 114 is listed in the contact list, device 102 starts receiving the communication from device 114. If device 102 fails to find the sending party device 114 listed in the contact list of receiving party device, the device 102 sends a query for the sending party name to the CNAM database 116 and/or the other database 118. The query may be sent via at least one communication address such as 120, 106, and 130 (the communication address may include but not limited to a wired communication and/or a wireless communication such as a cellular device, a Wi-Fi connection, a PDA, a Bluetooth connection, or the like) of the device 102 to the CNAM database 116 and/or the other database 118 via a direct connection or via a data network (not shown). Once the query is received, a lookup is performed in the CNAM database 116 and/or the other database 118 for the sending party name and other information relating to sending party. If the sending party name is unavailable in the contact list of the receiving party, the information of the sending party is shared with an alert party device 132. For example, if a new person contacts the receiving party whose information is not stored in the receiving party device. A lookup may be performed for information relating to the calling party in a database, wherein the lookup is based on an identifier associated with the message. The calling party information such as at least a number, name, geographical location etc is then sent to the alert party device alerting that an unrecognized party is communicating with the receiving party. The alert party may be able to view the message and other details of the calling party. This aspect of the invention may be most helpful when an unrecognized number is trying to communicate with a child and the information of the unrecognized number may be sent to a parent to alert such communication.

In an embodiment of the invention, the device 102 may send an alert to the alert party device 132 for authorizing the message so that communication may be establish between the calling party device and the receiving party device. The alert may include the message that is received at the receiving party device 104 and the information received from the CNAM database 116 and/or the other database 118. The alert party device 132 may review the message and the information and approve or decline the authorization by sending an authorization code to the receiving party device. In an embodiment of the invention, the alert party device 132 may authorize the message and the information by sending a message to the device 102. In an embodiment of the invention, the information is presented by displaying on the device 104 or receiving party device 104. In another embodiment of the invention, the information is presented as audio. In other case, if the message and the information are not recognized by the alert party device then the information and message are suppressed and not presented on the device 102 or the receiving party device 104. Further, in this case the message and the information may be deleted and the sending party may be blocked from sending message or communicating with the receiving party. For example, the receiving party may be a child and the authorizing party may be the parent of the child. Therefore, when the child receives a message from a sending party that is not known or details of the sending party is not in available or stored in the child's communication device, then the message and the information obtained from the databases are sent to the parents for authorization. The message and the information may then be displayed to the child if the parents allow communication between the sending party. In an embodiment of the invention, the parent may delete the message or even block the sending party for further communication with the child. As a result, the child is protected from receiving unwanted messages.

According to certain aspects, upon viewing the message and the information, the alert party may manually communicate with the receiving party of the decision to authorize or deny the receiving party from receiving further communications from the sending party. It should be appreciated that, according to certain aspects, the authorizing party or the parent may communicate the decision using electronic means such as phone or email or in person.

According to certain aspects, the alert party may consult with the receiving party to find out the identity of the sending party and authorize or deny further communications with the sending party based on the consultation.

In addition to displaying/playing the information, the device 102 may send the information to other receiving party devices, such as the calling party devices 104, 122, and 126, to be contemporaneously displayed on displays 109, 124, and 128 respectively. In this example, the displays 109, 124, and 128 are implemented as standalone devices. In other embodiments, the displays 109, 124, and 128 can be communicably coupled to the calling party devices 104, 122, and 126 or may be integrated with the calling party devices 104, 122 and 126 without departing the spirit and scope of the present disclosure. For example, the display 128 may be integrated as part of the calling party device 126 and the device 102 may send information directly to the calling party device 126 to be displayed on the display 128. The information may be sent from at least one communication address such as 106, 120, 130 of device 102 or via the wireless connection 130. Similarly, the device 102 may send information directly to the calling party device 122 to be played as an audio.

In an embodiment, optionally, prior to performing the lookup of the sending party name, the device 102 may send at least a query to the CNAM database 116 or the other database 118 via an IP connection to perform a lookup of the receiving number in the database. The CNAM database 116 or the other database 118 determines if the subscriber of the receiving number is a paid subscriber. To determine whether the subscriber is a paid subscriber, the CNAM database 116 or the other database 118 may send information of the receiving number, including, the receiving party name, a credit card number, or a zipcode, to another database for verification. If the verification is acceptable, the CNAM database 116 or the other database 118 then returns the sending party name and other information associated with the sending party to the device 102.

In an embodiment of the present disclosure, the device 102 may determine if a software download is necessary on the device 102. For example, the device 102 may determine that a software download is necessary in order to obtain sending party information based on the caller ID, ANI or other identifier. The device 102 may initiate the software download either directly from a Web database or via a network, such as the Internet. Alternatively, if the software for obtaining sending party information is already stored on the device 102, no software download may be necessary.

After the software is downloaded or stored on the device 102, the device 102 recognizes the caller ID, ANI or other identifier of the sending party from the sending party device 114. The caller ID, ANI or other identifier of the sending party may comprise a 10 digit number, such as a telephone number. In response to recognizing the caller ID or other identifier of the sending party, the device 102 sends the caller ID or identifier of the sending party to the CNAM database 116 or the other database 118 to perform a lookup of the sending number.

The information received at the device 102 may include number(s) that indicates the sender's phone number, as well as the sender's name, city, and/or state. In addition, the information includes, for example, alerts in response to an occurrence of an event, informative and promotional information from a service provider, and situational information from an emergency service provider. Furthermore, the information may include information relating to the sending party, such as an address, a hyperlink, a photo, a video, and any information that can be sent via an Internet Protocol connection.

An example of alerts in response to an occurrence of an event may involve a child (receiving party) who has ordered a refill of prescription from a pharmacy. When the prescription is ready for pickup, the pharmacy may send a message to the device 102. The CNAM database 116 or the other database 118 may return a message to the device 102 intended for the receiving party. The message may indicate that the prescription is ready for pickup in addition to the pharmacy's name and telephone number. Also, the message may include helpful information including directions to the pharmacy, operating hours of the pharmacy, allergic reactions to the prescription, web sites for additional information about the prescription and/or the affliction the prescription is intending to solve, links to such web sites that can be accessed directly from one or more of the displays, and coupons or codes for use with the prescription and/or for other items in the pharmacy that can be used in person and/or on-line. The number or other details of the pharmacy may not be stored or available in the child's communication device contact list and if so, a message may be send to the parent communication device (alert party) along with the information of the pharmacy and other details of the pharmacy. The parent may be able to view the message receive by the child.

An example of informative and promotional information from a service provider may involve a receiving party who is subscribed to television cable service from a cable company. The cable company may send a message upon issuance of a new bill to the device 102. The CNAM database 116 or the other database 118 may return a message to the device 102 intended for the receiving party. The message may indicate that a bill is ready for review in addition to the company's name and telephone number. In addition, the message may include promotional information, such as television shows that are scheduled for the evening or movies ready for order by the receiving party.

An example of situational information from a service provider may involve a tornado that is heading towards a receiving party. The emergency service provider, such as the police or fire department, may send a message to the device 102 which may be located at the receiving party's residence. The CNAM database 116 or the other database 118 may return an emergency message to the device 102 intended for the receiving party. The message may indicate that a tornado is heading towards the residence in addition to the emergency service provider's name and telephone number. Also, the message may include the location and speed of the tornado based on the latest data and directions to nearby tornado shelters or other information related to the event.

In addition, if the information associated with the sending party, including sending name, is changed in the CNAM database 116 or the other database 118, the device 102 may send a query for updated information associated with the sending number to CNAM database 116 or other database 118. Continuing with the prescription example, the device 102 may recognize that a reorder of the prescription is necessary based on the information stored in the device 102. The device 102 may send a query to CNAM database 116 or the other database 118 for the updated sender's number, name, city, state, or other information such that the receiving party may use the updated information as well as the reminder in the message to reorder the prescription.

Another example of updated information associated with the sending number may involve the change of city and/or state of the sending number in the CNAM database 116 or the other database 118. The device 102 may send a query for the updated city and/or state associated with the sending number to the CNAM database 116 or the other database 118. The CNAM database 116 or the other database 118 may return the updated information associated with the sending number to the device 102.

Alternative to sending a query in response to a change of information, the device 102 may perform a periodic update of sending information from the CNAM database 116 or the other database 118. For example, the device 102 may perform an update of sending information associated with the sending number by sending a query to the database hourly, daily, weekly, bi-weekly, monthly, yearly, or after any predefined period of time.

Although the device 102 is shown separate from the receiving party device 104, a person skilled in the art will appreciate that they can be co-located. Moreover, the receiving party device 104 may include all the functionalities of the device 102, without departing from the scope of this invention.

Figure 2:
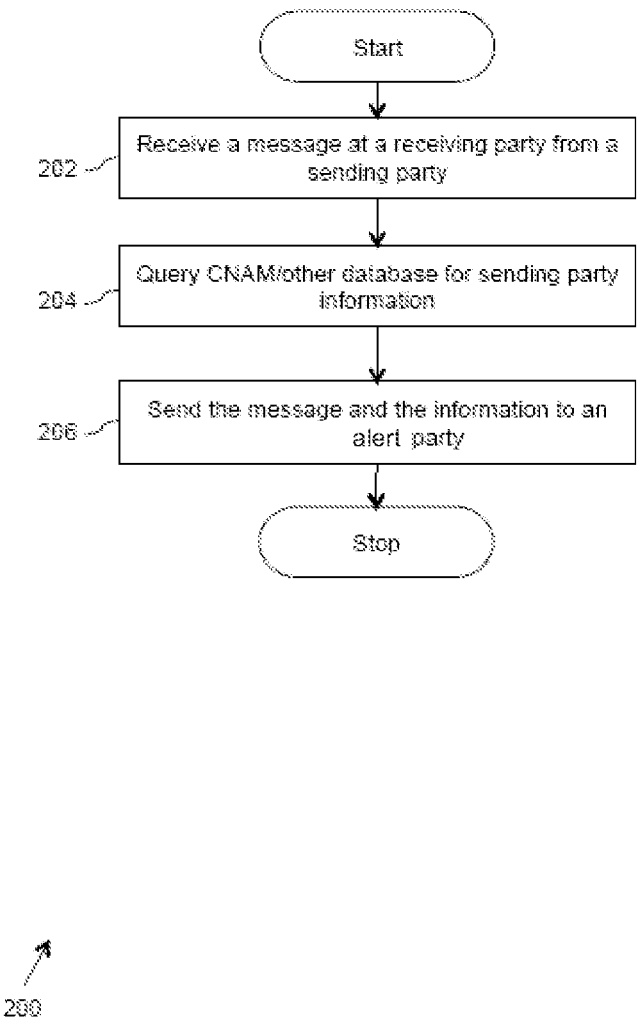
FIG. 2 depicts a flowchart of a method or computer readable medium comprising instructions for providing an alert to an alert party in accordance with one embodiment of the present disclosure.

Referring to FIG. 2, a flowchart of a method or computer readable medium comprising instructions for providing an alert to an alert party in accordance with one embodiment of the present disclosure. In this example, process 200 may be implemented as instructions executing within the device 102. The process 200 begins at step 202, when a sending party sends a message to the receiving party. The message may include a caller ID, ANI or other identifier of the sending party. The ANI or identifier may be received at least one communication address such as 106, 120, 130 of device 102. Thereafter, at step 204, the device 102 queries the CNAM database 116 or the other database 118 for the sending party information based on the caller ID, ANI or identifier. According to certain aspects, upon receiving the caller ID, ANI or other identifier, the device 102 looks up a local list of or the contact list of the receiving party to determine if the sending party device 114 detail is already present in the receiving party device 104. If device 102 finds the sending party device 114 is listed in the contact list of the receiving party, device 102 starts receiving the communication from device 114. The device 102 queries the CNAM database only if device 102 fails to find the sending party device 114 listed in the contact list of the receiving party. The query may be sent via at least one communication address 106, 120, 130 of the device 102. At step 206, the device 102 may send the message and the information to an alert party 132. Thereafter, the alert party may be able to view the information and other details of the calling party.

Figure 3:
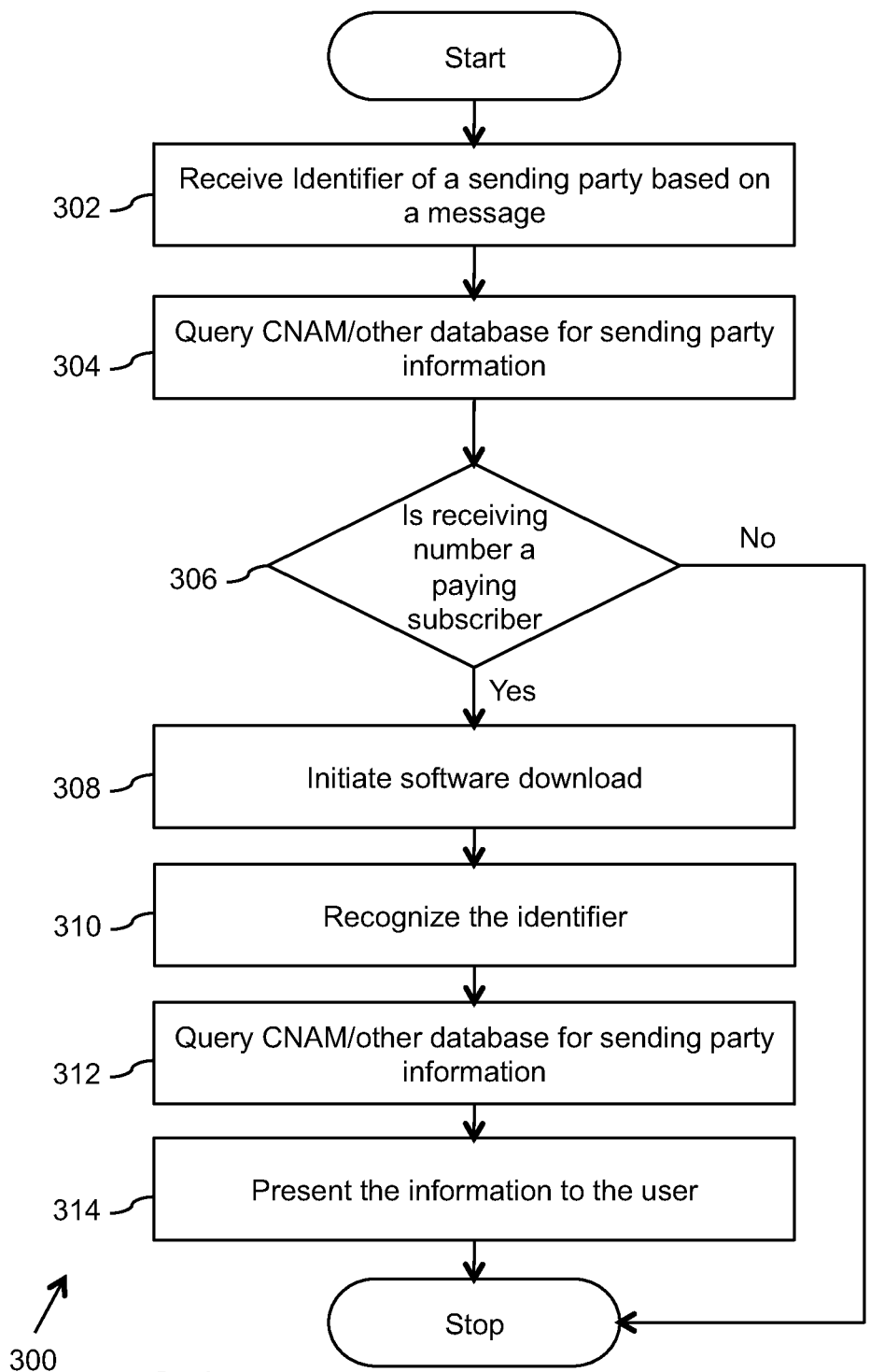
FIG. 3 depicts a flowchart of a process (which includes a method or computer readable medium comprising instructions) for checking whether the receiving party is a paid subscriber of the service in accordance with an embodiment of the present disclosure.

Referring to FIG. 3, a flowchart of a process 300 (which includes a method or computer readable medium comprising instructions) for checking whether the receiving party is a paid/authorized subscriber of the service is depicted, in accordance with an embodiment of the present disclosure. The process 300 begins at step 302, with receiving the caller ID or identifier of the sending party at the device 102. The identifier includes the number of at least one of a sending party and a receiving party. Next, the process 300 continues to step 304 to query the CNAM database or the other database of the receiving number via an Internet protocol connection. The process 300 then continues to step 306 to determine if the subscriber of the receiving number is a paying subscriber. This step may be accomplished by sending information of the receiving number to another database or website for verification. If the subscriber is not a paying customer, the process 300 terminates.

In case, the subscriber is a paid customer, then the process 300 continues to step 308 to initiate software download either directly from a database or via the Internet. Thereafter, the process 300 continues to step 310 to recognize the ANI or identifier of the sending party and delivering the ANI to the device 102. The process 300 then continues to step 312 to query the CNAM database or other database for information associated with the calling number via an Internet protocol connection. Examples of information include the caller's number, name, city, state, an address, a text, a video, a hyperlink, or any other information that may be sent via the Internet protocol connection. Subsequently, at step 314 the sending party information may be presented.

In an embodiment of the present disclosure, the device 102 may determine if a software download is necessary on the device 102. For example, the device 102 may determine that the software download is necessary in order to obtain sending party information based on the caller ID, ANI or other identifier. The device 102 may initiate the software download either directly from a Web database or via a address, such as the Internet. Alternatively, if the software for obtaining sending party information is already stored on the device 102, no software download may be necessary. For example, the process 300 then continues to determine if the subscriber of the receiving number is a paying subscriber. This step may be accomplished by sending information of the receiving number to another database or website for verification.

Figure 4:
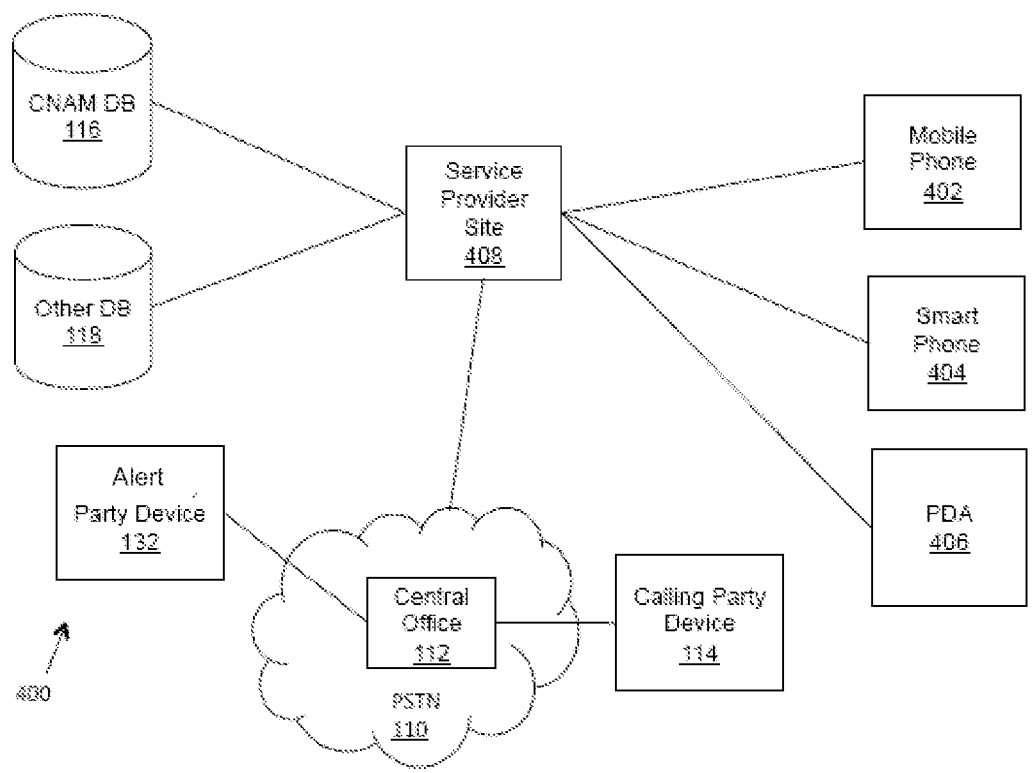
FIG. 4 depicts a system 400 for viewing communication between various parties in a wireless communication medium in accordance with one embodiment of the present disclosure.

Referring to FIG. 4, a system 400 for providing communication between various parties via a wireless communication medium in accordance with an alternative embodiment of the present disclosure. System 400 is similar to system 100 in FIG. 1, except that device 102 is implemented as a wireless communication enabled device. Device 102 is being implemented as a mobile phone 402, a smart phone 404, or a Personal Digital Assistant (PDA) 406. In an embodiment of the invention, the software of device 102 is implemented on receiving party devices such as the mobile phone 402, the smart phone 404, or the PDA 406. To send and receive information to and from the CNAM database 116 or other database 118, one or more of mobile devices 402, 404, and 406 can wirelessly communicate with a service provider site 408, which is also communicably coupled to the CNAM database 116 and the other databases 118 via a data network (not shown) and the calling party device(s) 114 (here after referred to as sending party device(s) 114) via the PSTN 110. The sending party device 114 can be, but not limited to, a mobile phone, a smart phone, a PDA, a landline and so forth.

In accordance with one embodiment of the present disclosure, aspects of the present disclosure are provided within the receiving party devices. Thus, when a sending party sends a message using the sending party device 114, the mobile device receives a caller ID, Automatic Number Identification (ANI) or other identifier of the sending party. An example of the identifier may include an IP address of the sending party device 114 or a unique identifier of the sending party that can be received and transmitted by the sending party device 114.

The identifier may include information related to at least one of a sending party and a receiving party.

According to certain aspects, upon receiving the caller ID, ANI or other identifier, the mobile device 402 looks up a local list or a contract list of the receiving party to check if the sending party device 114 information is already available in the mobile device 402. If the mobile device 402 finds the sending party device 114 listed at least in a contact list, mobile device 402 starts communicating with the sending device 114. If mobile device 402 fails to find the sending party device 114 listed in at least the contact list of the receiving party, the mobile device 402 sends a query for the sending party name to the CNAM database 116 and/or the other database 118. The query may be sent wirelessly from the receiving party device to the CNAM database 116 and/or the other database 118 via a direct connection or via a data network (not shown). Once the query is received, a lookup is performed in the CNAM database 116 and/or the other database 118 for the sending party name and other information. If the sending party name or other information is new or if the sending party information is unavailable or unrecognized by the contact list of the receiving party, the information of the sending party may be shared with an alert party device 132. The information received after the query is generated is shared with the alert party device 132. The alert party may receive an alert. The alert party may be able to view the message and other information regarding the calling party. The alert may include the message that is received at the receiving party device and the information received from the CNAM database 116 and/or the other database 118. In an embodiment the alert party device 132 may review the message and the information and provide or decline the communication between the calling party and receiving party.

In certain aspects, the authorizing party may consult with the receiving party in order to take a decision of authorization. In an embodiment of the invention, the alert party device 132 may authorize the message and the information by sending a message to the receiving party device. In case, the message and the information are authorized, then they are presented on the receiving party device. In an embodiment of the invention, the information is presented as audio. In other case, if the message and the information are not authorized or the authorization is declined then the information and message are suppressed and not presented on the receiving party device. Further, in this case the message and the information may be deleted and the sending party may be blocked from sending message or communicating with the receiving party. For example, the receiving party can be a child and the alert party may be the parents of the child. Therefore, when the child receives a message from a sending party that is not known, then the message and the information obtained from the databases are sent to the parents for authorization. The message and the information may then be displayed to the child if the parent authorizes the sending party. According to certain aspect of the invention, the parent may delete the message or even block the sending party for further communication with the child. As a result, the child is protected from receiving unwanted messages.

Figure 5:
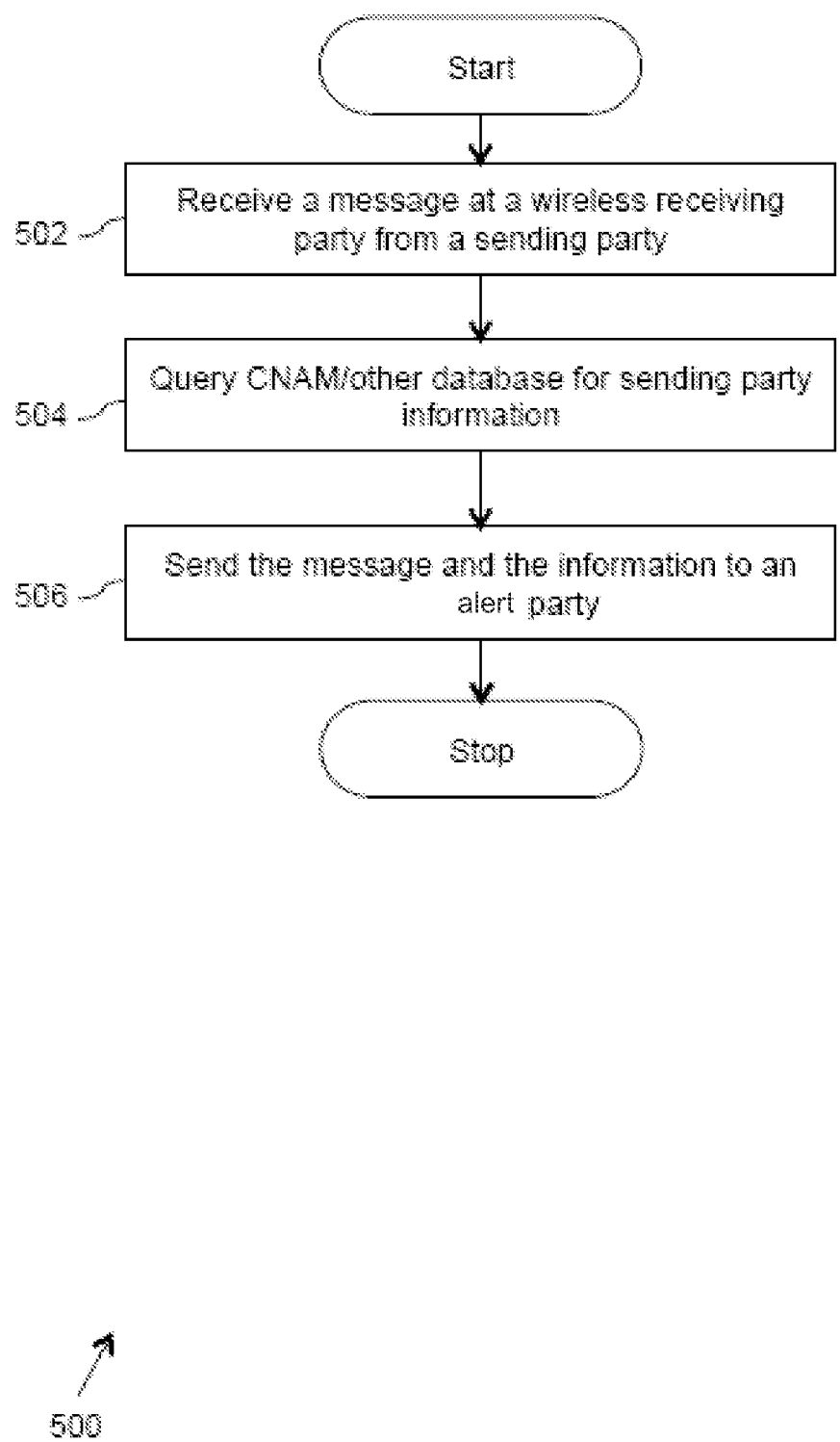
FIG. 5 depicts a flowchart of a method or computer readable medium comprising instructions for providing an alert to an alert party in a wireless communication medium in accordance with one embodiment of the present disclosure.

Referring to FIG. 5, a flowchart of a method or computer readable medium comprising instructions for providing an alert to an alert party in accordance with one embodiment of the present disclosure. In this example, process 500 may be implemented as instructions executing within the wireless receiving device 402. The process 500 begins at step 502, when a sending party sends a message to the wireless receiving party. The message may include a caller ID, ANI or other identifier of the sending party. The ANI or identifier may be received wirelessly at the receiving party device 402.

According to certain aspects, upon receiving the caller ID, ANI or other identifier, the receiving party device 402 looks up a local list of contacts to check if the sending party information is already present in the receiving party device 402. If device 402 finds the sending party device information, device 402 starts receiving the communication from the sending party device. If device 402 fails to find the sending party device listed in the list of contacts, the receiving party device 402 queries the CNAM database 116 or the other database 118 for the sending party information based on the caller ID, ANI or identifier. The query may be sent wirelessly from the receiving party device 402. At step 506, the receiving party device 402 may send the message and the information to the alert party 132. Thereafter, the alert party may be able to view the information and other details of the calling party.

Although an exemplary embodiment of the system, method, and computer readable medium of the present disclosure has been illustrated in the accompanied drawings and described in the foregoing detailed description, it will be understood that the invention is not limited to the embodiments disclosed, but is capable of numerous rearrangements, modifications, and substitutions without departing from the spirit and scope of the present disclosure as set forth and defined by the following claims. For example, a greater or lesser numbers of elements, modules, hardware, software, and/or firmware can be used to provide information delivery without departing from the spirit and scope of the present disclosure. Also, the device 102 may be a wireless mobile phone, a personal digital assistant, a cellular phone, an IP-enabled caller ID device, or a wired telephone that has IP communication capabilities. Further, the device 102 may include a memory (not shown) and a processor (not shown) to execute the process or the instructions. The memory may be for example, a Read Only Memory (ROM), a Random Access Memory (RAM), a disc media or any other computer readable medium comprising instruction executable by the processor.

The embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions can be loaded onto one or more general purpose computers, or other programmable data processing apparatus to produce machines, such that the instructions which execute on the computers or other programmable data processing apparatus create means for implementing the functions specified in the block or blocks. Such computer program instructions can also be stored in a computer-readable memory that can direct a computer or other programmable data processing apparatus to function in a particular manner, such that the instructions stored in the computer-readable memory produce an article of manufacture including instruction means that implement the function specified in the block or blocks.

What is claimed is:

1. A method, comprising:
receiving a message comprising text information and an identifier associated with a calling party from the calling party at a receiving party;
sending an alert comprising the text information of the message to an alert party when information related to the calling party is unavailable in a database;
providing an option to the alert party to delete the message;

receiving a command to delete the message and the text information; and deleting the message and the text information.

2. The method of claim 1, comprising performing the lookup of the information relating to the calling party in the database, wherein the performing comprises:

sending a query with the identifier to the database;
determining if the identifier is located in the database; and
receiving information associated with the calling party when the identifier is located in the database.

3. The method of claim 1, further comprising permitting the alert party to view the message and the text information regarding the calling party if the calling party information is unavailable in a contact list of the receiving party.

4. The method of claim 1, wherein the alert further comprises a name and a number of the calling party.

5. The method of claim 1, wherein sending an alert to the alert party comprises displaying the information along with other details of the calling party on a device of the alert party.

6. The method of claim 1, wherein if the calling party is available in a receiving party contact list, displaying the message on a device of the receiving party.

7. The method of claim 1, wherein if the calling party is available in a receiving party contact list, playing an audio of the message on a device of the receiving party.

8. The method of claim 1, further comprising receiving the alert and reviewing the message to determine whether to authorize the message to be received by the receiving party, when at least one of the message and the text information are not recognized by the receiving party device.

9. The method of claim 1, wherein the message comprises at least one of a text message and a multimedia message.

10. The method of claim 1, wherein the information relating to the calling party comprises at least one of a telephone number of the calling party, a name, a city, a state, an address, a photo, a video, a text, and a hyperlink that can be sent via an Internet protocol connection.

11. A system, comprising:

at least one device of a receiving party for receiving a message from a calling party comprising text information and an identifier associated with the calling party; and at least one database for storing information associated with the calling party, wherein the at least one device is operable to send an alert comprising the text information of the message to an alert party when the calling party information is determined to be unavailable, provide an option to the alert party to delete the message, receive a command to delete the message and the information; and delete the message and the information.

12. The system of claim 11, wherein the at least one device is operable to perform the lookup of the information relating to the calling party in the at least one database, wherein the perform comprises:

send a query with the identifier to the database;
determine if the identifier is located in the database; and
receive information associated with the calling party if the identifier is located in the database.

13. The system of claim 11, wherein the alert party is further operable to:

suppress the message and the information associated with the calling party; and
present the message and the text information to the receiving party after authorization.

14. The system of claim 11, wherein if the calling party is available in a receiving party contact list, displaying the message on the device of the receiving party.

15. The system of claim 11, wherein if the calling party is available in a receiving party contact list, playing an audio of the message on the device of the receiving party.

16. The system of claim 11, wherein the alert party is further operable to receive the alert and review the message to determine whether to authorize the message to be received by the receiving party, if the message and the text information are not recognized by the device of the receiving party.

17. A non-transitory computer-readable storage medium comprising instructions executable by a processor that cause the processor to perform:

receiving a message from a calling party comprising text information and an identifier associated with the calling party;
sending an alert comprising the text information of the message to an alert party if the calling party information is unavailable in a database;
providing an option to the alert party to delete the message;
receiving a command to delete the message and the text information of the message; and
deleting the message and the text information of the message.

18. The non-transitory computer-readable storage medium of claim 17, wherein the processor is further configured to perform:

informing the alert party when the calling party information is unavailable in the receiving party;
suppressing the message and the information of the calling party; and
presenting the message and information to the alert party.

19. The non-transitory computer-readable storage medium of claim 17, wherein the processor is further configured to perform a lookup of the information relating to the calling party in the database via an Internet Protocol connection, wherein the lookup comprises:

sending a query with the identifier to the database;
determining if the identifier is located in the database; and
receiving information associated with the calling party if the identifier is located in the database.

20. The non-transitory computer-readable storage medium of claim 17, wherein the processor is further configured to perform displaying the message on a device of the receiving party if the calling party information is present in a contact list of the receiving party.

* * * * *